(12) United States Patent
Oda et al.

(10) Patent No.: US 7,423,629 B2
(45) Date of Patent: *Sep. 9, 2008

(54) POSITION DETECTION SYSTEM AND POSITION DETECTOR

(75) Inventors: Yasuo Oda, Kuki (JP); Toshihiko Horie, Ageo (JP)

(73) Assignee: Wacom Co., Ltd., Saitama-Ken (JP)

( * ) Notice: Subject to any disclaimer, the term of this patent is extended or adjusted under 35 U.S.C. 154(b) by 720 days.

This patent is subject to a terminal disclaimer.

(21) Appl. No.: 10/808,537

(22) Filed: Mar. 25, 2004

(65) Prior Publication Data

US 2004/0246230 A1 Dec. 9, 2004

(30) Foreign Application Priority Data

Mar. 28, 2003 (JP) .............................. 2003-089615

(51) Int. Cl.
G09G 5/00 (2006.01)

(52) U.S. Cl. .................................. 345/156; 178/18.01

(58) Field of Classification Search .............. 178/18.07, 178/18.01; 342/374; 345/173, 156
See application file for complete search history.

(56) References Cited

U.S. PATENT DOCUMENTS

| | | | | |
|---|---|---|---|---|
| 5,028,745 A * | 7/1991 | Yamanami et al. | ....... | 178/18.07 |
| 5,045,645 A | 9/1991 | Hoendervoogt et al. | | |
| 5,225,637 A | 7/1993 | Rodgers et al. | | |
| 5,434,372 A * | 7/1995 | Lin | .......... | 178/18.07 |
| 5,557,076 A | 9/1996 | Wieczorek et al. | | |
| 5,567,920 A * | 10/1996 | Watanabe et al. | ........ | 178/18.07 |
| 5,635,684 A * | 6/1997 | Fukuzaki | ................. | 178/18.07 |
| 5,675,130 A * | 10/1997 | Sekizawa | ................. | 178/18.07 |
| 5,682,019 A * | 10/1997 | Katsurahira et al. | ...... | 178/18.07 |
| 5,691,513 A * | 11/1997 | Yamamoto et al. | ....... | 178/18.07 |
| 6,020,849 A * | 2/2000 | Fukuzaki | ..................... | 342/374 |
| 6,396,005 B2 * | 5/2002 | Rodgers et al. | .......... | 178/18.01 |
| 6,670,561 B2 * | 12/2003 | Aoki | ........................ | 178/18.01 |
| 6,888,538 B2 * | 5/2005 | Ely et al. | .................... | 345/173 |
| 2005/0104865 A1 * | 5/2005 | Oda et al. | .................... | 345/173 |

FOREIGN PATENT DOCUMENTS

| | | |
|---|---|---|
| EP | 0 915 429 A2 | 5/1999 |
| EP | 0 915 429 A3 | 4/2000 |

* cited by examiner

*Primary Examiner*—Amare Mengistu
*Assistant Examiner*—Yuk Chow
(74) *Attorney, Agent, or Firm*—Berenato, White & Stavish

(57) ABSTRACT

A position detection system includes a position pointer and a position detector. The "blind" area in which a position pointed to by a position pointer is undetectable is minimized. A transmission coil selector selects one of a plurality of transmission coils. A signal is generated by a transmission signal generator and supplied to a selected transmission coil. The selected transmission coil transmits the signal to the position pointer. A reception sensor coil selector selects a plurality of sensor coils. A position-indicating signal transmitted from the position pointer is received by each selected sensor coil, and a position pointed to by the position pointer is calculated from the received position-indicating signals. The position detection system loop coils are part of a resonant LC transmission circuit and are excited with a pulsed carrier signal to maximize the strength of the transmission signal, while dissipating relatively little power.

29 Claims, 8 Drawing Sheets

PRIOR ART

POSITION DETECTION SYSTEM AND POSITION DETECTOR

CROSS-REFERENCE TO RELATED APPLICATIONS AND CLAIM TO PRIORITY

This application claims priority under 35 U.S.C. § 119 to Japanese patent application number 2003-089615, filed Mar. 28, 2003, the disclosure of which is incorporated herein by reference.

FIELD OF THE INVENTION

The present invention relates to position pointers, position detectors for detecting a position pointed to by a position pointer by means of electromagnetic coupling, and a position detection system using a position detector, for use as an input device in a CAD (Computer Aided Design) system, a computer, a PDA (Personal Digital Assistant) device, or other data input applications.

DISCUSSION OF THE PRIOR ART

Conventionally, as an input device in a CAD system or a computer, a position detection system of the electromagnetic coupling type is used in which a signal is transmitted by means of electromagnetic coupling between a position pointer and a position detector, and a position pointed to by the position pointer is detected by the position detector.

For example, Japanese Unexamined Patent Application Publication No. 5-88811 discloses a system in which a single transmission coil is disposed in a peripheral part of a sensor area in a position detector, and FIG. 10 is a schematic diagram of a sensor part of the position detector in which one transmission coil, 1001, is disposed outside and close to an area in which a plurality of sensor coils 1002 are disposed. Note that in FIG. 10, for the purpose of simplification, of the plurality of sensor coils 1002 extending in both X and Y directions, only sensor coils disposed in the X direction are shown and sensor coils in the Y direction are not shown. In FIG. 10, a signal to detect the position is supplied by means of electromagnetic coupling to a position pointer (not shown) from the transmission coil 1001. Thereafter, the plurality of sensor coils 1002 are selected one by one, and a position-indicating signal transmitted from the position pointer is received, by means of electromagnetic coupling, by the selected one of the sensor coils 1002. The position of the position pointer is detected in accordance with the detection signals received by the plurality of sensor coils 1002.

In the position detection system disclosed in the patent application cited above, use of only one transmission coil 1001 provides the advantage that the transmitting circuit for transmitting the signal to detect the position by which to detect the position of the position pointer can be constructed in a simple fashion.

However, in the above-described position detection system, when the center of the position pointer is located just above the wound wire of the transmission coil 1001, the signal to detect the position cannot excite the position pointer, and thus it is impossible to detect the position.

One possible technique to avoid the above problem is to dispose the wound wire of the transmission coil 1001 outside the reception sensor coil 1002. This prevents the position pointer from becoming impossible to be excited, and thus it becomes possible to detect the position of the position pointer at any location.

However, this technique results in an increase in an area in which there is no sensor coil 1002 and thus the position of the position pointer cannot be detected. That is, there is a large insensible area 1003 between the transmission coil 1001 and the sensor coils 1002.

Several possible applications for position detection systems provide additional challenges. For example, a portable device such as a mobile telephone or personal digital assistant (PDA) is improved with a convenient user interface including a stylus and digitizer type position detection system, but strict power consumption budgets are mandated when choosing features for portable devices.

There is a need, therefore, for an electromagnetic-coupling position detection system including a minimized area in which a position pointed to by a position pointer cannot be detected. There is also a need for a power conserving, efficient electromagnetic-coupling position detection system.

OBJECTS AND SUMMARY OF THE INVENTION

Accordingly, it is a primary object of the present invention to overcome the above mentioned difficulties by providing an electromagnetic-coupling position detection system including a minimized insensitive area in which a position pointed to by a position pointer cannot be detected.

Another object of the present invention is to provide an electromagnetic-coupling position detector including a minimized insensitive area in which a position pointed to by a position pointer cannot be detected.

Another object of the present invention is to provide a power conserving, efficient electromagnetic-coupling position detection system.

The aforesaid objects are achieved individually and in combination, and it is not intended that the present invention be construed as requiring two or more of the objects to be combined unless expressly required by the claims attached hereto.

The present invention provides a position detection system comprising a position pointer including at least one coil for pointing to a position and a position detector for detecting the position pointed to by the position pointer by transmitting and receiving a signal to and from the position pointer by means of electromagnetic coupling; the position detector comprising a plurality of transmission coils for transmitting a signal to detect the position to the position pointer, a plurality of sensor coils for receiving the signal transmitted from the position pointer, signal transmission means for selecting one of the plurality of transmission coils in accordance with the position of the position pointer and driving the selected transmission coil so as to transmit the signal to detect the position, reception means for selecting the plurality of sensor coils one by one and receiving the signal transmitted from the position pointer, and position detection means for detecting the position pointed to by the position pointer in accordance with the signal received by the reception means.

In the position detection system of the present invention, the signal transmission means selects one of the plurality of transmission coils in accordance with the position of the position pointer and drives the selected transmission coil to transmit the signal to detect the position. The reception means selects the plurality of sensor coils one by one and receives the signal transmitted from the position pointer. The position detection means detects the position pointed to by the position pointer in accordance with the signal received by the reception means.

The plurality of transmission coils may be disposed to be coaxial with each other. The signal transmission means may define a plurality of sub areas in the sensor area in which the plurality of transmission coils are disposed, and the signal transmission means may select a transmission coil capable of supplying a strongest signal to detect the position to the position pointer depending on a particular sub area in which the position pointer is located, and may drive the selected transmission coil thereby supplying the signal to detect the position to the position pointer.

Depending on the relative spatial relationship between the selected transmission coil and the position of the position pointer detected by the position detection means, the signal transmission means may drive the selected transmission coil such that the phase of the signal to detect the position supplied to the position pointer is maintained without being inverted.

Depending on whether the position pointer is located in the inside or the outside of the selected transmission coil, the signal transmission means may invert the phase of the signal by which to drive the transmission coil such that the signal to detect the position supplied to the position pointer is maintained unchanged in terms of its phase.

The plurality of transmission coils may include a first transmission coil and a second transmission coil disposed outside the first transmission coil, the first and second transmission coils being coaxial with each other.

Three sub areas may be defined in the sensor area in which the position of the position pointer is detectable, such that the three sub areas includes a first area in which when the signal to detect the position is transmitted in a first phase, the first transmission coil is capable of transmitting the signal to detect the position with a greater signal level than the second transmission coil can, a second area in which when the signal to detect the position is transmitted in the first phase, the second transmission coil is capable of transmitting the signal to detect the position with a greater signal level than the first transmission coil can, and a third area in which when the signal to detect the position is transmitted in a second phase opposite to the first phase, the first transmission coil is capable of transmitting the signal to detect the position with a greater signal level than the second transmission coil can, wherein the signal transmission means may transmit the signal to detect the position in the first phase from the first transmission coil when the position pointer is located in the first area, the signal transmission means may transmit the signal to detect the position in the first phase from the second transmission coil when the position pointer is located in the second area, and the signal transmission means may transmit the signal to detect the position in the second phase from the first transmission coil when the position pointer is located in the third area.

The reception means may sequentially select a predetermined number of sensor coils located in the first area and an area adjacent to the first area and may receive the signal transmitted from the position pointer when the position pointer is located in the first area, the reception means may sequentially select a predetermined number of sensor coils located in the second area and an area adjacent to the second area and may receive the signal transmitted from the position pointer when the position pointer is located in the second area, and the reception means may sequentially select a predetermined number of sensor coils located in the third area and an area adjacent to the third area and may receive the signal transmitted from the position pointer when the position pointer is located in the third area.

In another aspect, the present invention provides a position detector that transmits and receives a signal to and from a position pointer including at least one coil for pointing to a position thereby detecting the position pointed to by the position pointer, the position detector comprising a plurality of transmission coils for transmitting a signal to detect the position to the position pointer, a plurality of sensor coils for receiving the signal transmitted from the position pointer, signal transmission means for selecting one of the plurality of transmission coils in accordance with the position of the position pointer and driving the selected transmission coil so as to transmit the signal to detect the position, reception means for selecting the plurality of sensor coils one by one and receiving the signal transmitted from the position pointer, and position detection means for detecting the position pointed to by the position pointer in accordance with the signal received by the reception means.

In the position detector of the present invention, the signal transmission means selects one of the plurality of transmission coils in accordance with the position of the position pointer and drives the selected transmission coil to transmit the signal to detect the position. The reception means selects the plurality of sensor coils one by one and receives the signal transmitted from the position pointer. The position detection means detects the position pointed to by the position pointer in accordance with the signal received by the reception means.

The position detection system of the present invention differs from the prior art by more than merely reducing the number of coils used to transmit the position pointer excitation signal. Instead, the loop coils in the tablet are used as part of a resonant LC transmission circuit. In the prior art, an input stylus or position pointer had a resonant circuit permitting the position pointer to receive a signal from the loop coils and then to retransmit a signal to the loop coils when they were switched to the "off" or "position pointer excitation signal receive" state. In the system and method of the present invention, resonant circuits are used in both the stylus and the transmission loop coils. The transmission loop coil resonant circuit is configured to have a selected resonant frequency. The transmission loop coils are excited with a series of pulses comprising a carrier frequency modulated with a sequence of pulses to generate a pulsed carrier signal having a selected carrier frequency which is substantially equal to the transmission loop coils resonant frequency. This arrangement maximizes the strength of the transmission signal even though relatively little power is required.

The receive loop coils are arrayed in both X and Y axes. The two sets of transmission loop coils each have 1 or 2 loop coils, and there is an array of receive loop coils for each axis. Once the receive coil closest to the stylus is determined, then sector scanning is utilized for the receive loop coils.

Optionally, the position detection system of the present invention is a sensor built into a portable device such as a mobile telephone or PDA and so power from a limited supply (e.g., a battery) must be conserved. In order to conserve power, the position detection system's electromagnetic wave cannot be transmitted and received on the same coil, and so the transmission coil(s) and the reception coils are separated. In addition, the transmission coil(s) are arranged around the sensor or receive coils to optimize efficiency of transmission. The transmission coil(s) can be arranged inside or outside of the sensor. In order to conserve power, relatively small pulsed current is passed through the transmission coils and the resonant (e.g., LC) circuit is employed to efficiently power the transmission loop coils which have an intrinsic inductance. By applying the pulsed carrier waveform to the transmission coils through a series capacitor, a resonant circuit is configured which uses the available power in a most efficient manner.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENTS

Figure 1:
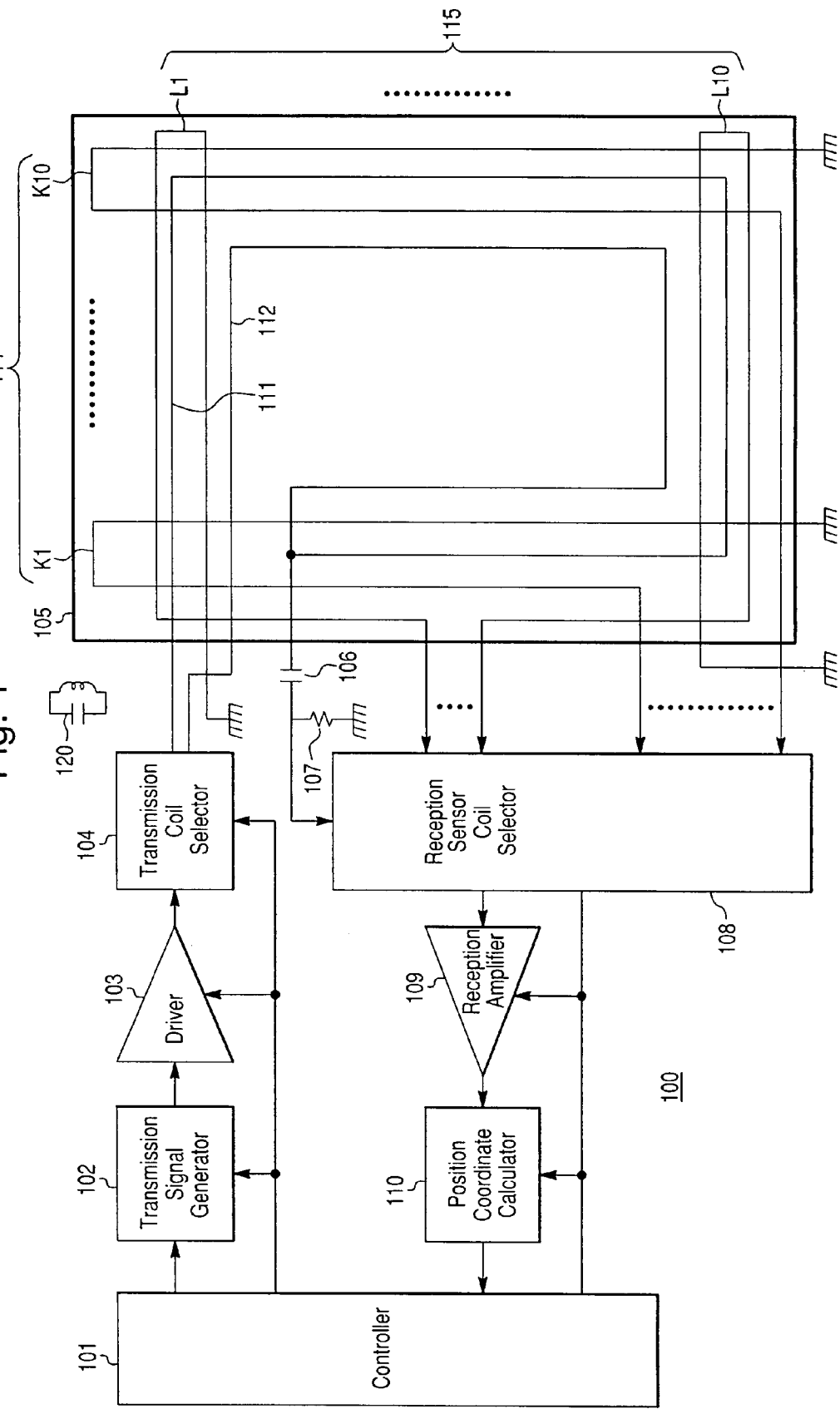
FIG. 1 is a block diagram illustrating a position detection system according to a first embodiment of the present invention.

A position detection system and a position detector according to the present invention are described in further detail below with reference to specific embodiments in conjunction with the accompanying drawings. Throughout all figures, similar parts are denoted by similar reference numerals.

FIG. 1 is a block diagram illustrating a position detection system according to a first embodiment of the present invention. In this first embodiment of the present invention, the position detection system includes a position pointer 120 for pointing to a position and a position detector 100 for detecting the position pointed to by the position pointer 120.

The position pointer 120 includes at least one coil and serves to point to a position. In this position pointer 120, the coil is connected with a capacitor such that a resonant circuit is formed by the coil and the capacitor.

The position detector 100 includes a controller 101, a transmission signal generator 102 for generating a signal to detect the position, a driver 103, a transmission coil selector 104 for selecting a transmission coil for transmitting the signal to detect the position and driving the selected transmission coil, a sensor area serving as a sensor part, a capacitor 106, a resistor 107, a reception sensor coil selector 108, and a reception amplifier 109, and a position coordinate calculator 110.

The controller 101 serves as signal transmission means, reception means, and detection means. The transmission signal generator 102, the driver 103, and the transmission coil selector 104 form signal transmission means. The reception sensor coil selector 108 and the reception amplifier 109 form reception means. The position coordinate calculator 109 serves as the detection means.

The controller 101 controls the overall operation of the position detector 100, and also individually controls the transmission signal generator 102, the driver 103, the transmission coil selector 104, the reception sensor coil selector 108, the reception amplifier 109, and the position coordinate calculator 110.

Under the control of the controller 101, the transmission signal generator 102 generates a signal to detect the position for exciting the position pointer 120 thereby detecting a position pointed to by the position pointer 120. The driver 103 amplifies the signal to detect the position output by the transmission signal generator 102 and supplies the resultant signal to the transmission coil selector 104. The transmission coil selector 104 selects, under the control of the controller 101, one transmission coil from a plurality of transmission coils 111 and 112 and supplies the signal to detect the position to the selected transmission coil thereby driving it.

In this first embodiment, two transmission coils 111 and 112 are provided as the plurality of transmission coils. The plurality of transmission coils 111 and 112 are disposed such that they extend parallel with each other without overlapping each other and such that the central axis of each of the transmission coils 111 and 112 lies on substantially the same line (that is, such that the transmission coils 111 and 112 are coaxial with each other). The transmission coils 111 and 112 extend in the sensor area 105 along the periphery of the sensor area 105 such that the transmission coil 111 is located on an outer side and the transmission coil 112 is located on an inner side.

The sensor part 105 includes a receiving part 113 in which the plurality of transmission coils 111 and 112 and the plurality of sensor coils are disposed. The receiving part 113 includes a plurality of sensor coils (sensor coils in the X direction) 114 disposed side by side in a X direction, and a plurality of sensor coils (sensor coils in the Y direction) 115 disposed side by side in a Y direction perpendicular to the X direction.

The outer transmission coil 111 and the inner transmission coil 112 may be disposed such that at least one of them is located in the outside of the area in which sensor coils 114 and 115 are disposed. Alternatively, the outer transmission coil 111 and the inner transmission coil 112 may be disposed such that neither is disposed entirely outside the area in which sensor coils 114 and 115 are disposed, that is, such that both extend through the area in which the sensor coils 114 and 115 are disposed.

Under the control of the controller 101, the reception sensor coil selector 108 scans the plurality of sensor coils 114 and 115 to select them one by one, and supplies a detection signal detected by the selected one of the sensor coils 114 and 115 to the reception amplifier 109. Under the control of the controller 101, the reception amplifier 109 amplifies the detection signal received from the reception sensor coil selector 108, and supplies the resultant amplified detection signal to the position coordinate calculator 110. In accordance with the detection signal received from the reception amplifier 109, the position coordinate calculator 110 calculates the X coordinate and the Y coordinate (XY coordinates) indicating the position of the position pointer 120, and outputs the calculated XY coordinates to the controller 101. In accordance with the XY coordinates indicating the position of the position pointer 120 detected by the position coordinate calculator 110, the controller 101 performs various controls including the control of the phase of the signal output by the transmission signal generator 102 and the selection of the transmission coils 111 and 112 performed by the transmission coil selector 104.

Figure 2:
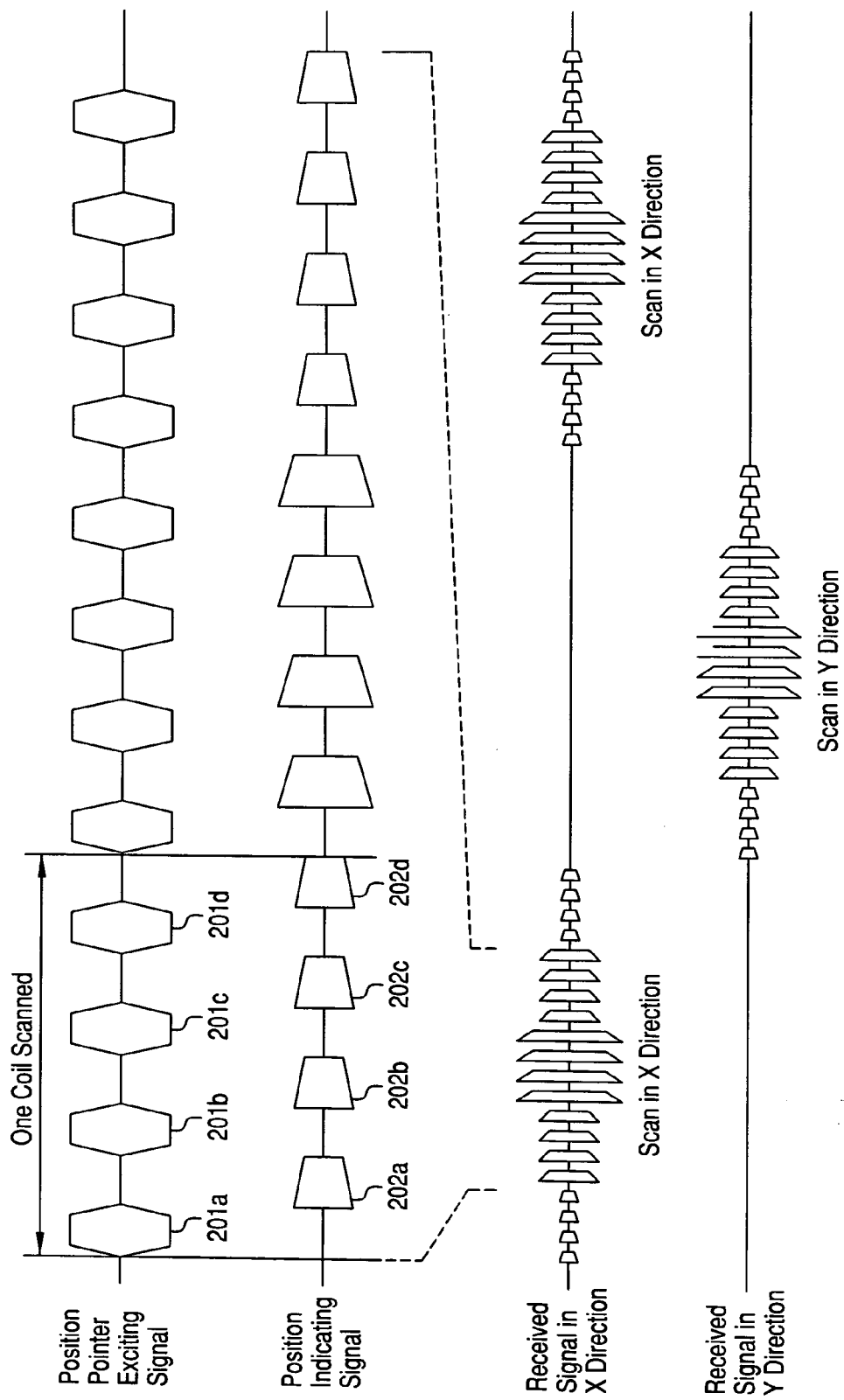
FIG. 2 is a timing diagram associated with the position detection system according to the first embodiment of the present invention.

FIG. 2 is a timing diagram associated with the operation of the position detection system according to the first embodiment. In this first embodiment, to detect the position of the position pointer 120, the sensor coils 114 in the X direction are first scanned, and then, after completion of scanning the sensor coils 114 in the X direction, the sensor coils in the Y direction 115 are scanned.

Position detection system 100 uses transmission coils 111, 112 to transmit an excitation signal to resonant position pointer 120. Transmission coils 111, 112 each have an inherent inductance of approximately ten micro Henrys (10 mH) and comprise part of a resonant LC transmission circuit including series capacitor 106, which preferably has a value of one hundredth microfarad (0.01 µF). In the system and method of the present invention, the transmission loop coils are excited with a series of pulses comprising a five hundred kilohertz (500 kHz) carrier frequency modulated with a sequence of pulses to generate a pulsed carrier signal (as shown in FIG. 2). The pulsed carrier signal has a selected carrier frequency substantially equal to the transmission loop coil resonant circuit's resonant frequency, namely, five hundred kilohertz (500 kHz). This arrangement maximizes the strength of the transmission signal to position pointer 120 even though relatively little power is dissipated.

Receive loop coils 114, 115 are arrayed in both X and Y axes. The two sets of transmission loop coils each have 1 or 2 loop coils, and once the receive coil closest to the stylus is determined, then sector scanning is utilized for the receive loop coils.

Optionally, the position detection system of the present invention may comprise a sensor built into a portable data processing device such as a mobile telephone, laptop computer or personal digital assistant (PDA) (not shown) and power from a limited supply (e.g., a battery) is conserved.

Transmission coil(s) 111, 112 are arranged around receive coils 114, 115 to optimize efficiency of transmission and can be arranged inside or outside of the sensor receive coils 114, 115. In order to conserve power, a relatively small pulsed current is passed through the transmission coils 111, 112. The resonant LC circuit defined by a selected transmit coil (e.g., 111) and series capacitor 106 powers the transmission loop coil to generate an inductive or "B" field to energize resonant position pointer 120. By applying the pulsed carrier waveform of FIG. 2 to the transmission coils through series capacitor 106, an efficient, power conserving resonant circuit uses the battery's limited power in a most efficient manner.

Figure 3:
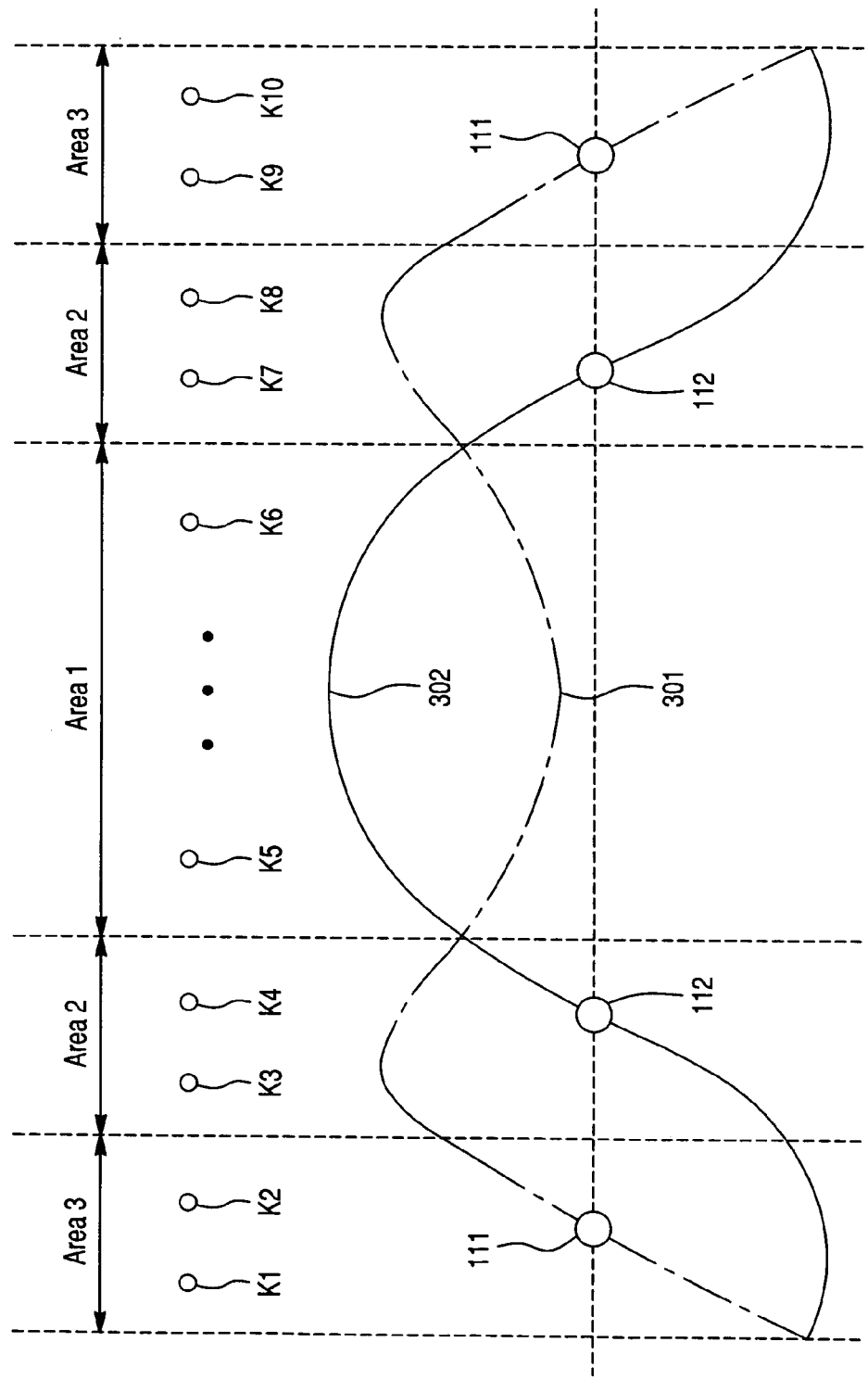
FIG. 3 is a diagram illustrating the operation of the position detection system according to the first embodiment of the present invention.

FIG. 3 is a diagram illustrating the operation of selecting and driving the transmission coil 111 or 112 in the position detection system according to the first embodiment. Note that although only the sensor coils 114 in the X direction are illustrated in FIG. 3, selecting and driving are also performed in a similar manner for the sensor coils 115 in the Y direction.

In FIG. 3, K1 to K10 denote sensor coils in the X direction shown in FIG. 1. A signal 301 indicates the signal level of an alternating magnetic field generated by the outer transmission coil 111 excited by a driving signal. A signal 302 indicates the signal level of an alternating magnetic field generated by the inner transmission coil 112 excited by a driving signal.

As shown in FIG. 3, the sensor area includes three sub areas: area 1 to area 3. In the first area 1, when the signal to detect the position is positive in phase (first phase), the output level of the inner transmission coil 112 is larger than the output level of the outer transmission coil 111. In the second area 2, when the signal to detect the position is positive in phase (first phase), the output level of the outer transmission coil 111 is larger than the output level of the inner transmission coil 112. In the third area 3, when the signal to detect the position has a phase (second phase) opposite to the above-described positive phase, the output level of the inner transmission coil 112 is larger than the output level of the outer transmission coil 111.

Figure 4:
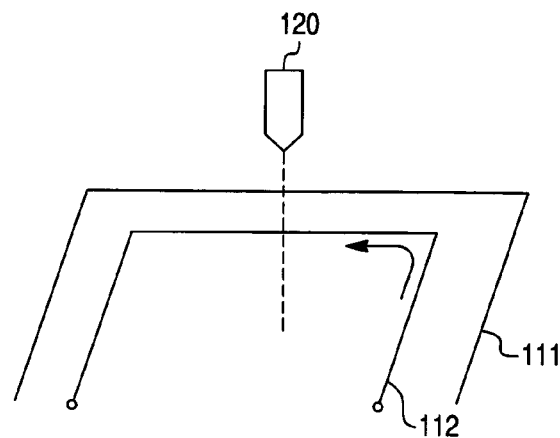
FIG. 4 is a schematic diagram illustrating the operation of the position detection system according to the first embodiment of the present invention.
Figure 5:
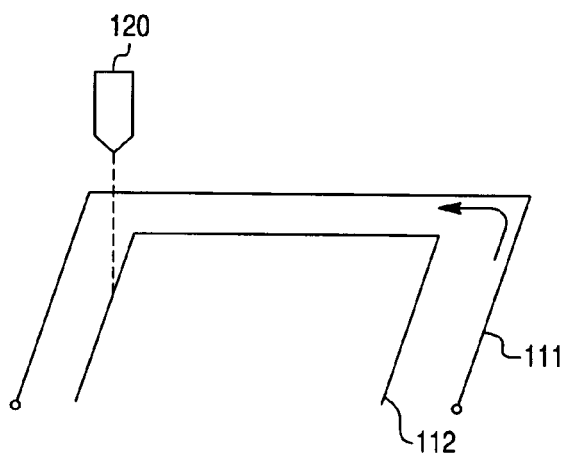
FIG. 5 is a schematic diagram illustrating the operation of the position detection system according to the first embodiment of the present invention.
Figure 6:
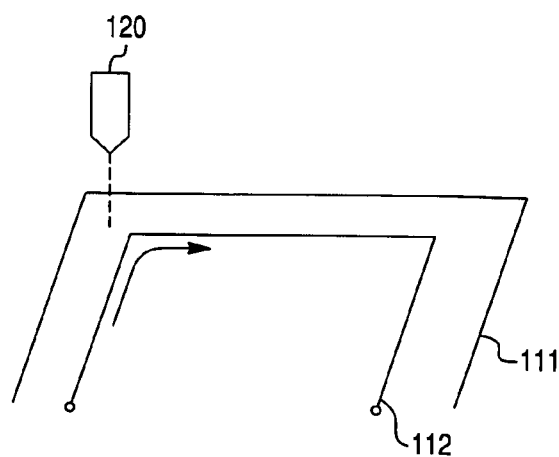
FIG. 6 is a schematic diagram illustrating the operation of the position detection system according to the first embodiment of the present invention.

FIGS. 4 to 6 are diagrams illustrating the operation of switching the transmission coils 111 and 112 in the position detection system according to the first embodiment.

The operation of the first embodiment is described in detail below referring to FIGS. 1 to 6.

In a state immediately after turning on the power the position detection system, the position detector 100 does not know the position of the position pointer 120. In this state, the position of the position pointer 120 is detected in an all scan mode, as descried below.

In the all scan mode, in the position detector 100, the controller 101 controls the reception sensor coil selector 108 so that the sensor coils 114 in the X direction are scanned and selected one by one from a sensor coil K1 at one end to a sensor coil K10 at the opposite end. One of the transmission coils 111 and 112 is selected which can provide a strongest signal to detect the position in an area in which the position pointer 120 is currently located, and the selected one of the transmission coils 111 and 112 is excited in a positive or negative phase to detect the position in the X direction of the position pointer. Similarly, sensor coils 115 in the Y direction are scanned and selected one by one from one end to the opposite end, and one of the transmission coils 111 and 112 is selected which can provide a strongest signal to detect the position in the area in which the position pointer 120 is currently located. The selected one of the transmission coils 111 and 112 is excited in a positive or negative phase to detect the position in the Y direction of the position pointer. Thus, the XY coordinates of the position pointer 120 are detected.

The operation of detecting the position in the all scan mode is described in further detail below. Under the control of the controller 101, the transmission signal generator 102 outputs a signal to detect the position. Under the control of the controller 101, the driver 103 amplifies the signal to detect the position and outputs the resultant amplified signal to detect the position. Under the control of the controller 101, the transmission coil selector 104 selects one transmission coil from the plurality of transmission coils 111 and 112 and supplies, to the selected transmission coil, the signal to detect the position output from the driver 103.

The operation of selecting one of the transmission coils 111 and 112 is described below with reference to FIG. 3. In a case in which one of the sensor coils K1, K2, K9, and K10 in the area 3 is selected and a position-indicating signal output from the position pointer 120 is received by the selected sensor coil, a signal to detect the position is transmitted from the inner transmission coil 112 to detect the position of the position pointer 120. In this case, under the control of the controller 101, the transmission signal generator 102 transmits a signal to detect the position with a negative phase.

In a case in which one of the sensor coils K3, K4, K7, and K8 in the area 2 is selected and a position-indicating signal output from the position pointer 120 is received by the selected sensor coil, a signal to detect the position is transmitted from the outer transmission coil 111 to detect the position of the position pointer 120. In this case, under the control of the controller 101, the transmission signal generator 102 transmits a signal to detect the position with a positive phase.

In a case in which one of the sensor coils K5 and K6 in the area 1 is selected and a position-indicating signal output from the position pointer 120 is received by the selected sensor coil, a signal to detect the position is transmitted from the inner transmission coil 112 to detect the position of the position pointer 120. In this case, under the control of the controller 101, the transmission signal generator 102 transmits a signal to detect the position with a positive phase.

From the transmission coil (for example, transmission coil 111) selected by the transmission coil selector 104, a signal to detect the position 201a is output as shown in FIG. 2. The position pointer 120 receives the signal to detect the position 201a output from the selected transmission coil 111 by means of electromagnetic coupling, and returns a position-indicating signal 202a to the position detector 100.

In the position detector 100, the controller 101 controls the reception sensor coil selector 108 so that the reception sensor coil selector 108 scans the sensor coils 114 in the X direction from one end to the opposite end (from K1 to K10) and selects sensor coils 114 one by one. In this scan-and-select operation, a first sensor coil K1 in the X direction first receives a position-indicating signal 202a. In this case, because the position-indicating signal 202a is received by the sensor coil K1 in the X direction disposed in the area 3, the position-indicating signal 202a is transmitted by the inner transmission coil 112.

The position-indicating signal received by the sensor coil K1 in the X direction is output as a X-direction detection signal to the reception amplifier 109 via the reception sensor coil selector 108. The X-direction detection signal is amplified by the reception amplifier 109 and output to the position coordinate calculator 110. The position coordinate calculator 110 temporarily stores the level of the detection signal into a memory (not shown) disposed, as storage means, in the position coordinate calculator 110.

The operation described above is performed 4 times for the sensor coil K1 in the X direction, and the level of the detection signal is stored in the memory of the position coordinate calculator 110 each time the operation is performed. The position coordinate calculator 110 calculates the average of four data stored in the memory of the position coordinate calculator 110 and stores the calculated average into the memory as the level of the X-direction detection signal detected by the sensor coil K1 in the X direction.

The above-described operation is performed for all sensor coils K1 to K10 in the sensor coil set 114 in the X direction one by one, whereby the position coordinate calculator 110 acquires the detection signal level (X-direction detection signal level) of each of all sensor coils K1 to K10 in the X direction and stores it in the memory. As described above, depending on which one of the areas 1 to 3 the position pointer 120 is located in, the transmission coil 111 or 112 is selected so that a greater signal to detect the position is supplied to the position pointer 120, and the selected transmission coil 111 or 112 is driven such that the phase of the signal to detect the position supplied to the position pointer 120 is maintained in positive phase without being inverted.

The position coordinate calculator 110 selects three highest signal levels of the detection signals detected by the sensor coils K1 to K10 in the X direction, and determines a point at which a parabolic curve fitted to the three signal levels has a peak value. The coordinate of the point at which the fitted parabolic curve has the peak value indicate the X coordinate of the position pointer 120.

Thereafter, the position detector 100 performs the above-described process on the sensor coil set 115 in the Y direction.

That is, the controller 101 scans the sensor coil set 115 in the Y direction to select sensor coils in the Y direction one by one from one end (coil L1) to the opposite end (coil L10), and the position coordinate calculator 110 determines the Y coordinate of the position pointer 120 in a similar manner to the manner in which the process is performed on the sensor coil set 114 in the X direction. The sensor area is also divided in the Y direction into three sub areas as in the X direction as described above with reference to FIG. 3. In a similar manner to the manner in which the transmission coil 111 or 112 is selected and driven depending on which one of the three areas 1 to 3 includes a sensor coil selected from the sensor coil set 114 in the X direction, the transmission coil selector 104 selects the transmission coil 111 or 112 depending on the area in which a selected sensor coil of the sensor coil set 115 in the Y direction is located, and the selected transmission coil 111 or 112 is driven such that the phase of the signal to detect the position supplied to the position indication 120 is maintained in a positive phase without being inverted.

The position coordinate calculator 110 detects the X coordinate and the Y coordinate (XY coordinates) of the position pointer 120 in the above-described manner.

The position coordinate calculator 110 outputs the data indicating the detected XY coordinates of the position pointer 120 to the controller 101.

After completion of detecting the position of the position pointer 120, depending on the relative spatial relationship between the position point 120 and the plurality of transmission coils 111 and 112, the controller 101 controls the transmission coil selector 104 so as to select, from the plurality of transmission coils 111 and 112, a transmission coil that supplies a strongest signal to detect the position to the position pointer 120 located in a particular area, and the controller 101 also controls the transmission signal generator 102 so as to drive the selected transmission coil positively or negatively such that the phase of the signal to detect the position supplied to the position pointer 120 is maintained in the positive phase (without being inverted).

Simultaneously, the controller 101 scans (in a sector scan mode) sensor coils 114 and 115 located in the area where the position pointer 120 is located and also scans a predetermined number of sensor coils 114 and 115 in areas close to the area in which the position pointer 120 is located (for example, sensor coils located in the area in which the position pointer 120 is located, and sensor coils located in areas directly adjacent to the area in which the position pointer 120 is located are scanned) so as to select the sensor coils in those areas one by one thereby detecting the position of the position pointer 120.

The sector scanning operation is described in further detail below. In the sector scan mode, one of the plurality of transmission coil 111 and 112 is selected and driven by a driving signal with a positive or negative phase depending on the relative position of the position pointer 120 with respect to the position of the selected transmission coil 111 or 112. The phase of the signal by which to drive the selected transmission coil is inverted depending on whether the position pointer 120 is located in the inside or the outside of the selected transmission coil, such that the phase of the signal to detect the position supplied to the position pointer 120 is maintained unchanged.

Referring to FIG. 3, when the transmission coil selector 104 selects a transmission coil from the plurality of transmission coils 111 and 112, the transmission coil selector 104 selects one that provides a strongest signal to the position pointer 120 located in a particular area.

More specifically, when the position pointer 120 is located in the area 1, the signal to detect the position is transmitted from the inner transmission coil 112 to the position pointer 120 whereby the position of the position pointer 120 is detected. In this case, since the position pointer 120 is located inside the selected transmission coil 112 (that is, the position pointer 120 is located in a central part of the sensor area 105), the signal to detect the position with the positive phase is output to the transmission coil 112 from the transmission signal generator 102.

FIG. 4 shows the operation of driving the transmission coil 111 or 112 in a case in which the position pointer 120 is located in the area 1. As shown in FIG. 4, when the position pointer 120 is located in the area 1, only the inner transmission coil 112 is driven positively without driving the outer transmission coil 111. A current is passed through the inner transmission coil 112 in a direction (positive direction) denoted by an arrow such that a signal to detect the position with a positive phase is generated in the form of an alternating magnetic field. As a result, the position pointer 120 is excited electromagnetically by the signal to detect the position with the positive phase.

When the position pointer 120 is located in the area 2, the signal to detect the position is transmitted from the outer transmission coil 111 to the position pointer 120 whereby the position of the position pointer 120 is detected. Also in this case, since the position pointer 120 is located inside the selected transmission coil 111, the signal to detect the position with the positive phase is output to the transmission coil 111 from the transmission signal generator 102.

FIG. 5 shows the manner in which the transmission coil 111 or 112 is driven when the position pointer 120 is located in the area 2. As shown in FIG. 5, when the position pointer 120 is located in the area 2, only the outer transmission coil 111 is driven positively without driving the inner transmission coil 112. A current is passed through the outer transmission coil 111 in a direction (positive direction) denoted by an arrow such that a signal to detect the position with a positive phase is generated in the form of an alternating magnetic field. As a result, the position pointer 120 is excited electromagnetically by the signal to detect the position with the positive phase.

When the position pointer 120 is located in the area 3, the signal to detect the position is transmitted from the inner transmission coil 112 to the position pointer 120 whereby the position of the position pointer 120 is detected. In this case, since the position pointer 120 is located outside the selected transmission coil 112 (peripheral area of the sensor area 105), the signal to detect the position with the negative phase is output to the transmission coil 111 from the transmission signal generator 102.

FIG. 6 shows the manner in which the transmission coil 111 or 112 is driven when the position pointer 120 is located in the area 3. As shown in FIG. 6, when the position pointer 120 is located in the area 3, only the inner transmission coil 112 is driven negatively without driving the outer transmission coil 111. A current is passed through the inner transmission coil 112 in a direction (negative direction) denoted by an arrow such that a signal to detect the position with a positive phase is generated in the form of an alternating magnetic field. As a result, the position pointer 120 is excited electromagnetically by the signal to detect the position with the positive phase.

As described above, the sensor area 105 in which the plurality of transmission coils 111 and 112 are disposed is divided into areas 1 to 3, and the signal transmission means selects a transmission coil capable of supplying a strongest signal to detect the position to the position pointer 120 currently located in a particular area, and drives the selected transmission coil thereby supplying the signal to detect the position to the position pointer 120.

The phase of the signal to detect the position by which to drive the transmission coil is inverted depending on whether the position pointer 120 is located inside or outside the selected transmission coil (whether the position pointer 120 is located in the central area or in the peripheral area of the sensor area), such that the position pointer 120 is excited in the same direction (positively) regardless of the location of the position pointer 120.

After the coil of the position pointer 120 is magnetically excited, if the excitation is stopped, the induced voltage gradually decreases. However, the induced voltage does not completely disappear, and the position pointer 120 has a residual induced voltage. When the position of the position pointer 120 is detected, the calculation is performed taking into account the residual induced voltage. If the coil of the position pointer 120 is excited negatively in phase depending on the location of the position pointer 120, the residual induced voltage is cancelled. This causes the signal to detect the position to be shifted from a correct value, and thus an error occurs in the detected position of the position pointer 120. In the present embodiment, to avoid the above problem, the polarity (phase) of the signal to detect the position transmitted from the transmission coil is inverted depending on the location of the position pointer 120 such that the position pointer 120 is excited in the same direction regardless of its location thereby minimizing the error in the detected position caused by the residual induced voltage.

As described above, in synchronization with selecting and driving the transmission coil 111 or 112, the controller 101 scans (in the sector scan mode) sensor coils 114 and 115 located in the area where the position pointer 120 is located and also scans a predetermined number of sensor coils 114 and 115 in areas close to the area in which the position pointer 120 is located (for example, sensor coils located in the area in which the position pointer 120 is located, and sensor coils located in areas directly adjacent to the area in which the position pointer 120 is located are scanned) so as to select the sensor coils in those areas one by one thereby detecting the position of the position pointer 120.

Thereafter, the process described above is performed repeatedly to detect the position of the position pointer 120.

Figure 7:
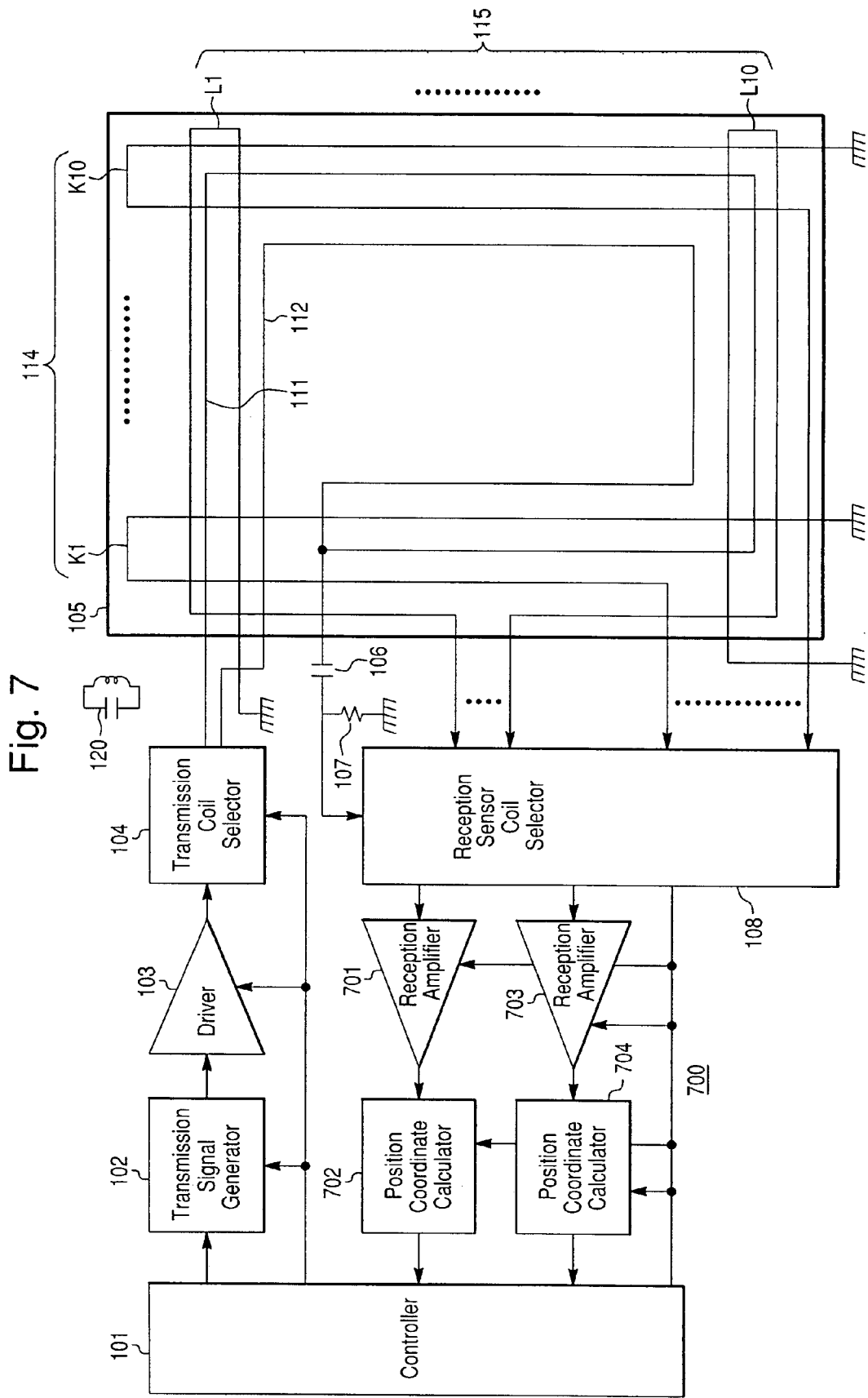
FIG. 7 is a block diagram illustrating a position detection system according to a second embodiment of the present invention.

FIG. 7 is a block diagram illustrating a position detection system according to a second embodiment of the present invention, wherein similar parts to those shown in FIG. 1 are denoted by similar reference numerals.

In this second embodiment of the present invention, the position detection system includes a position pointer 120 for pointing to a position and a position detector 700 for detecting the position pointed to by the position pointer 120.

As in the first embodiment described above, the position pointer 120 includes at least one coil and serves to point to a position. In this position pointer 120, the coil is connected with a capacitor such that a resonant circuit is formed by the coil and the capacitor.

The position detector 700 includes a controller 101, a transmission signal generator 102 for generating a signal to detect the position, a driver 103, a transmission coil selector 104 for selecting a transmission coil by which to transmit the signal to detect the position, a sensor part 105, a capacitor 106, a resistor 107, a reception sensor coil selector 108, a first reception amplifier 701, a first position coordinate calculator 702, a second reception amplifier 703, and a second position coordinate calculator 704.

The controller 101 serves as signal transmission means, reception means, and detection means. The transmission signal generator 102, the driver 103, and the transmission coil selector 104 form signal transmission means. The reception sensor coil selector 108 and the reception amplifiers 701 and 703 form reception means. The position coordinate calculators 702 and 704 form detection means.

The controller 101 controls the overall operation of the position detector 700, and also individually controls the transmission signal generator 102, the driver 103, the transmission coil selector 104, the reception sensor coil selector 108, the first reception amplifier 701, the first position coordinate calculator 702, the second reception amplifier 703, and the second position coordinate calculator 704.

Under the control of the controller 101, the transmission signal generator 102 generates a signal to detect the position for exciting the position pointer 120 thereby detecting a position pointed to by the position pointer 120. The driver 103 amplifies the signal to detect the position output by the transmission signal generator 102 and supplies the resultant signal to the transmission coil selector 104. The transmission coil selector 104 selects, under the control of the controller 101, one transmission coil from a plurality of transmission coils 111 and 112 and supplies a signal to detect the position to the selected transmission coil.

In this second embodiment, as in the first embodiment described above, two transmission coils 111 and 112 are provided as the plurality of transmission coils. The plurality of transmission coils 111 and 112 are disposed such that they extend parallel with each other without overlapping each other and such that the central axis of each of the transmission coils 111 and 112 lies on substantially the same line (that is, such that the transmission coils 111 and 112 are coaxial with each other). The transmission coils 111 and 112 extend in the sensor part 105 along the periphery of the sensor part 105 such that the transmission coil 111 is located on an outer side and the transmission coil 112 is located on an inner side.

The sensor part 105 includes a receiving part 113 in which the plurality of transmission coils 111 and 112 and the plurality of sensor coils are disposed. The receiving part 113 includes a plurality of sensor coils (sensor coils in the X direction) 114 disposed side by side in a X direction, and a plurality of sensor coils (sensor coils in the Y direction) 115 disposed side by side in a Y direction perpendicular to the X direction.

The outer transmission coil 111 and the inner transmission coil 112 may be disposed such that at least one of them is located in the outside of the area in which sensor coils 114 and 115 are disposed. Alternatively, the outer transmission coil 111 and the inner transmission coil 112 may be disposed such that neither is disposed entirely outside the area in which sensor coils 114 and 115 are disposed, that is, such that both extend through the area in which the sensor coils 114 and 115 are disposed.

Under the control of the controller 101, the reception sensor coil selector 108 simultaneously scans both the sensor coil set 114 in the X direction and the sensor coil set 115 in the Y direction to sequentially select them. A detection signal detected by each selected sensor coil 114 in the X direction is supplied to the reception amplifier 701, and a detection signal detected by each selected sensor coil 115 in the Y direction is supplied to the reception amplifier 701.

Under the control of the controller 101, the reception amplifier 701 amplifies the X-direction detection signal received from the reception sensor coil selector 108, and supplies the resultant amplified detection signal to the position coordinate calculator 702. In accordance with the X-direction detection signal received from the reception amplifier 701, the position coordinate calculator 702 calculates the X coordinate of the position of the position pointer 120, and outputs the calculated X coordinate to the controller 101.

Similarly, under the control of the controller 101, the reception amplifier 703 amplifies the Y-direction detection signal received from the reception sensor coil selector 108, and supplies the resultant amplified detection signal to the position coordinate calculator 704. In accordance with the Y-direction detection signal received from the reception amplifier 703, the position coordinate calculator 704 calculates the Y coordinate of the position of the position pointer 120, and outputs the calculated Y coordinate to the controller 101.

Depending on the X coordinate and the Y coordinate of the position of the position pointer 120 detected by the position coordinate calculators 702 and 704, the controller 101 performs various controls including the control of the phase of the signal output by the transmission signal generator 102 and the selection of the transmission coils 111 and 112 performed by the transmission coil selector 104.

Figure 8:
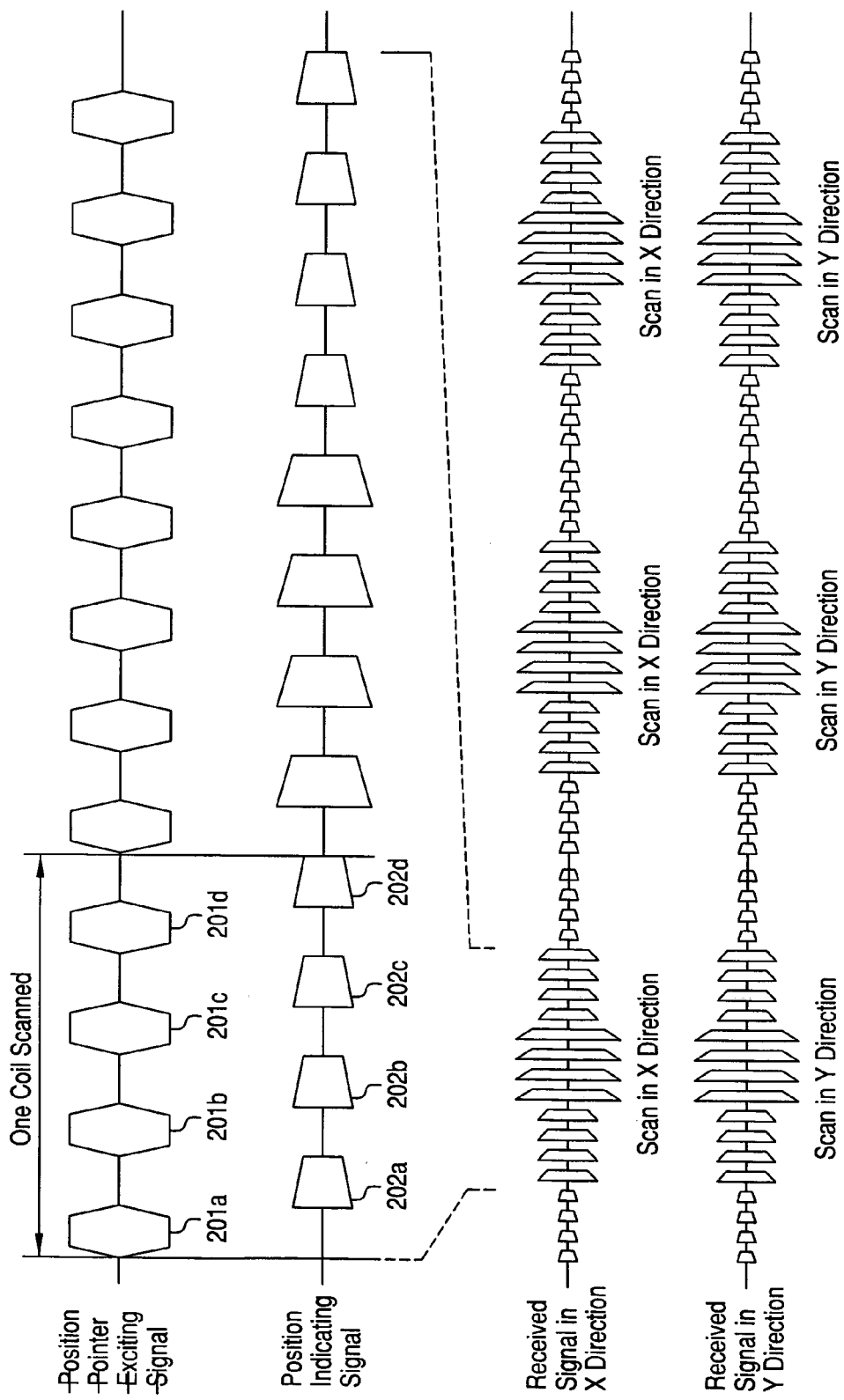
FIG. 8 is a timing diagram associated with the position detection system according to the second embodiment of the present invention.

FIG. 8 is a timing diagram associated with the operation of the position detection system according to the second embodiment. In this second embodiment, to detect the position of the position pointer 120, the sensor coils 114 in the X direction and the sensor coils in the Y direction 115 are scanned simultaneously.

The operation of the first embodiment is described below in detail referring to FIGS. 7 and 8. In the second embodiment, the operation of selecting and driving one of the transmission coils 111 and 112 is performed in a similar manner to the first embodiment, and thus a duplicated description thereof is not given herein.

In a state immediately after turning on the power the position detection system, the position detector 700 does not know the position of the position pointer 120. In this state, the position of the position pointer 120 is detected in an all scan mode, as descried below.

In the all scan mode, under control of a controller 101, the position detector 700 selects one of the transmission coils 111 and 112 and drives the selected transmission coil in a similar manner as shown above with reference to FIG. 3. Furthermore, the reception sensor coil selector 108 scans all sensor coils 114 in the X direction one by one, and, in parallel, the reception sensor coil selector 108 also scans all sensor coils 115 in the Y direction one by one to detect the position of the position pointer 120.

The operation of detecting the position in the all scan mode is described in further detail below. Under the control of the controller 101, the transmission signal generator 102 outputs a signal to detect the position. Under the control of the controller 101, the driver 103 amplifies the signal to detect the position and outputs the resultant amplified signal to detect the position. Under the control of the controller 101, the transmission coil selector 104 selects one transmission coil from the plurality of transmission coils 111 and 112 and supplies, to the selected transmission coil, the signal to detect the position output from the driver 103. In the above process, the selection of one of the transmission coils 111 and 112 is performed in a similar manner to the first embodiment.

From the selected transmission coil (for example, transmission coil 111), a signal to detect the position 201a is output as shown in FIG. 8. The position pointer 120 receives the signal to detect the position 201a output from the selected transmission coil 111 by means of electromagnetic coupling, and returns a position-indicating signal 202a to the position detector 700.

In the position detector 700, the controller 101 controls the reception sensor coil selector 108 so that the reception sensor coil selector 108 scans and selects the sensor coils 114 one by one in the X direction from one end to the opposite end (from coil K1 to coil K10), and simultaneously scans and selects the sensor coils 115 one by one in the Y direction from one end (coil L1) to the opposite end (coil L10). In this scan-and-select operation, a first sensor coil K1 in the X direction first receives a position-indicating signal 202a, and a first sensor coil L1 in the Y direction receives the position-indicating signal 202a.

The position-indicating signal received by the sensor coil K1 in the X direction is output as a X-direction detection signal to the reception amplifier 701 via the reception sensor coil selector 108. The X-direction detection signal is amplified by the reception amplifier 701 and output to the position coordinate calculator 702. The position coordinate calculator 702 temporarily stores the level of the detection signal into a memory (not shown) disposed, as storage means, in the position coordinate calculator 702.

The operation described above is performed 4 times for the sensor coil K1 in the X direction, and the level of the detection signal is stored in the memory of the position coordinate calculator 702 each time the operation is performed. The position coordinate calculator 702 calculates the average of four data stored in the memory of the position coordinate calculator 702 and stores the calculated average into the memory as the level of the X-direction detection signal detected by the sensor coil K1 in the X direction.

Simultaneously, the position-indicating signal received by the sensor coil L1 in the Y direction is output as a Y-direction detection signal to the reception amplifier 703 via the reception sensor coil selector 108. The X-direction detection signal is amplified by the reception amplifier 703 and output to the position coordinate calculator 704. The position coordinate calculator 704 temporarily stores the level of the detection signal into a memory (not shown) disposed, as storage means, in the position coordinate calculator 704.

The operation described above is performed 4 times for the sensor coil L1 in the Y direction, and the level of the detection signal is stored in the memory of the position coordinate calculator 704 each time the operation is performed. The position coordinate calculator 704 calculates the average of four data stored in the memory of the position coordinate calculator 704 and stores the calculated average into the memory as the level of the Y-direction detection signal detected by the sensor coil L1 in the Y direction.

The above-described operation is performed for all sensor coils in the sensor coil set 114 in the X direction and for all sensor coils in the sensor coil set 115 in the Y direction whereby the position coordinate calculator 702 acquires the detection signal level (X-direction detection signal level) of each of all sensor coils K1 to K10 in the X direction and stores it in the memory, and the position coordinate calculator 704 acquires the detection signal level (Y-direction detection signal level) of each of all sensor coils L1 to L10 in the Y direction and stores it in the memory. As described earlier, depending on which one of the areas 1 to 3 the selected sensor coils 114 and 115 in the X and Y directions are located, the transmission coil 111 or a transmission coil 112 is selected, and the selected transmission coil 111 or 112 is driven positively or negatively such that the position pointer 120 is excited always in the same direction by the signal to detect the position transmitted to the position pointer 120.

The position coordinate calculator 702 selects, from the X-direction detection level data stored in the memory, three highest signal levels of the detection signals detected by the sensor coils K1 to K10 in the X direction, and determines a point at which a parabolic curve fitted to the three signal levels has a peak value. The coordinate of the point at which the fitted parabolic curve has the peak value indicate the X coordinate of the position pointer 120. Similarly, the position coordinate calculator 704 selects, from the Y-direction detection level data stored in the memory, three highest signal levels of the detection signals detected by the sensor coils L1 to L10 in the Y direction, and determines a point at which a parabolic curve fitted to the three signal levels has a peak value. The coordinate of the point at which the fitted parabolic curve has the peak value indicate the Y coordinate of the position pointer 120. The position coordinate calculators 702 and 704 detect the X coordinate and the Y coordinate (XY coordinates) of the position pointer 120 in the above-described manner.

The position coordinate calculators 702 and 704 output the data indicating the detected X and Y coordinates of the position pointer 120 to the controller 101. After completion of detecting the position of the position pointer 120, depending on the relative spatial relationship between the position point 120 and the plurality of transmission coils 111 and 112, the controller 101 controls the transmission coil selector 104 so as to select, from the plurality of transmission coils 111 and 112, a transmission coil that supplies a strongest signal to detect the position to the position pointer 120 located in a particular area, and the controller 101 also controls the transmission signal generator 102 so as to generate a signal to detect the position such that the phase of the signal to detect the position supplied to the position pointer 120 is maintained in the positive phase (without being inverted).

Simultaneously, the controller 101 scans (in the sector scan mode) sensor coils 114 and 115 located in the area where the position pointer 120 is located and also scans a predetermined number of sensor coils 114 and 115 in areas close to the area in which the position pointer 120 is located (for example, sensor coils located in the area in which the position pointer 120 is located, and sensor coils located in areas directly adjacent to the area in which the position pointer 120 is located are scanned) so as to select the sensor coils in those areas one by one thereby detecting the position of the position pointer 120.

Also in the second embodiment, as described above, the insensible area in which the position of the position pointer is undetectable is minimized. Furthermore, the position pointer 120 is excited by the signal in the same direction. This minimizes the detection error of the position pointed to by the position pointer 120 caused by the residual induced voltage remaining in the position pointer 120.

In this second embodiment, because scanning of sensor coils 114 and 115 is performed in parallel in the X direction and Y direction, it is possible to scan the sensor coils at a rate twice the rate allowed in the first embodiment, and thus it becomes possible to detect the position of the position pointer in a shorter time.

Figure 9:
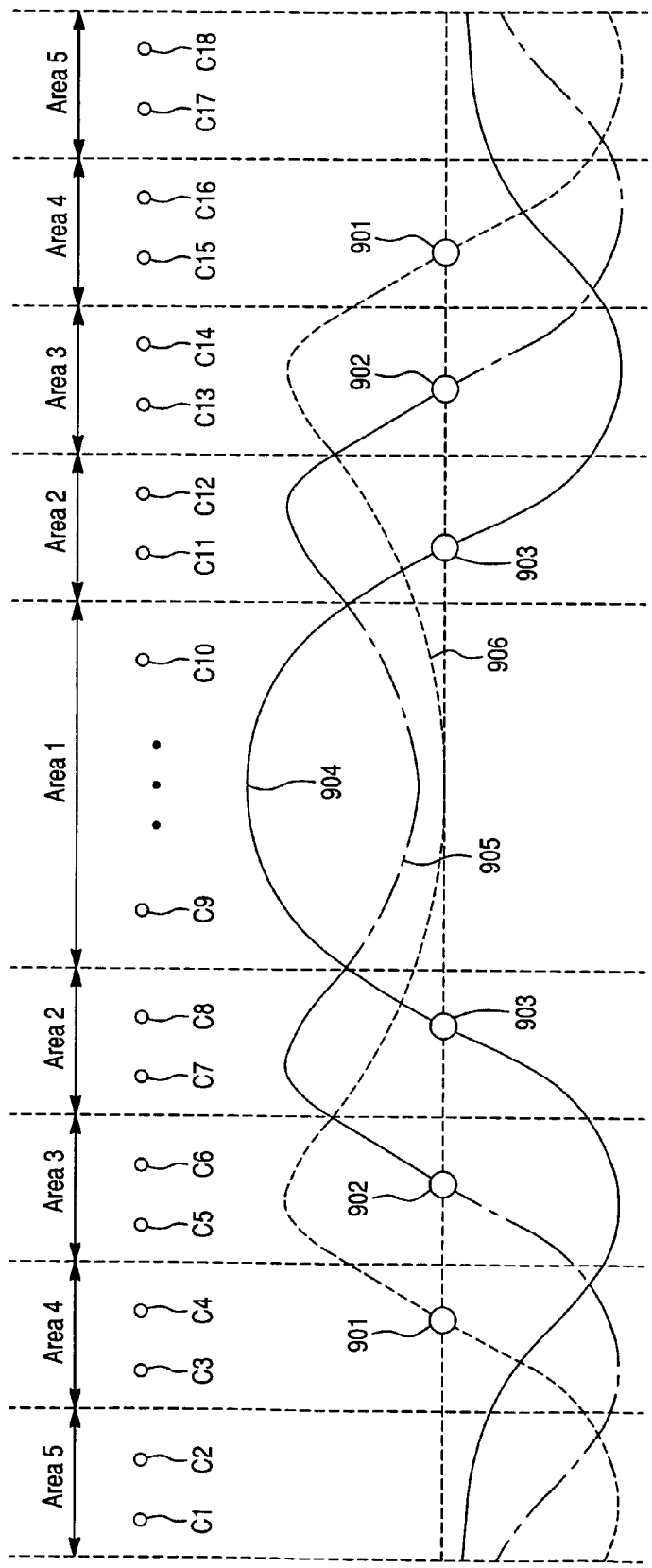
FIG. 9 is a diagram illustrating the operation of the position detection system according to a third embodiment of the present invention.
Figure 10:
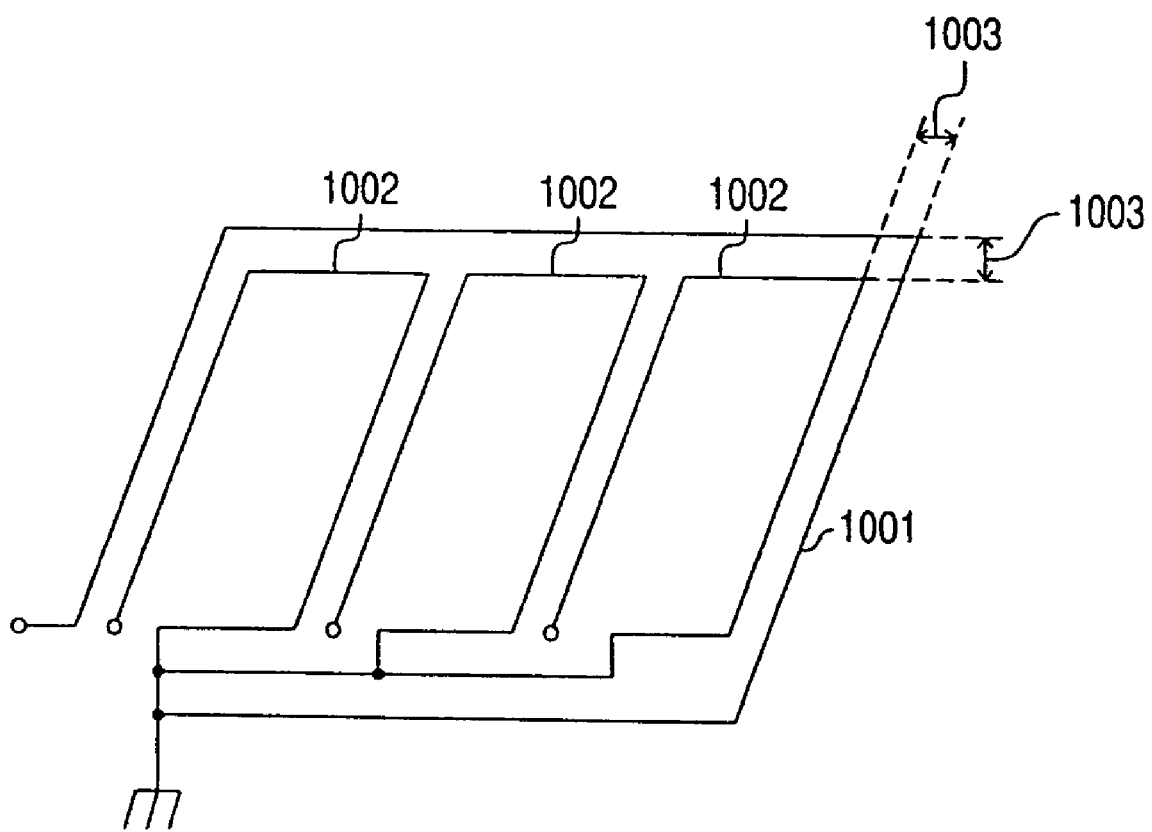
FIG. 10 is a schematic diagram illustrating the operation of a conventional position detection system.

Now, a third embodiment of the present invention is described below. FIG. 9 is a schematic diagram illustrating the operation of a position detection system according to the third embodiment of the present invention. FIG. 9 shows the operation of selecting one of transmission coils, wherein the operation shown herein corresponds to the operation shown in FIG. 3.

Although a block diagram showing the position detection system according to the third embodiment is not given herein, it is constructed in a similar manner to the first embodiment shown in FIG. 1 except that in this third embodiment, unlike the first embodiment in which the position detector 100 includes two transmission coils 111 and 112, the position detector includes three transmission coils 901, 902, and 903. Note that the position detector according to the third embodiment may be constructed so as to simultaneously detect detection signals in both X and Y directions, as in the second embodiment described above, by using a reception amplifier and a position coordinate calculator for the X direction and a reception amplifier and a position coordinate calculator for the Y direction.

The operation of the third embodiment is described in detail below referring to FIG. 9 and also FIG. 1 as required.

In FIG. 9, C1 to C18 denote sensor coils in the X direction. A signal 906 indicates the signal level of an alternating magnetic field generated by the outer transmission coil 901 when a signal to detect the position is supplied to the outer transmission coil 901. A signal 905 indicates the signal level of an alternating magnetic field generated by the middle transmission coil 902 when the signal to detect the position is supplied to the middle transmission coil 902. A signal 904 indicates the signal level of an alternating magnetic field generated by the inner transmission coil 903 when the signal to detect the position is supplied to the inner transmission coil 903.

As shown in FIG. 9, the sensor area includes a plurality of sub areas (five sub areas in this specific example). In a first area 1, when the signal to detect the position is positive in phase (first phase), the output level of the inner transmission coil 903 is larger than the output level of the outer transmission coil 901 and the middle transmission coil 902. In a second area 2, when the signal to detect the position is positive in phase, the output level of the middle transmission coil 902 is larger than the output level of the outer transmission coil 901 and the inner transmission coil 903. In a third area 3, when the signal to detect the position is positive in phase, the output level of the outer transmission coil 901 is larger than the output level of the middle transmission coil 902 and the inner transmission coil 903. In a fourth area 4, when the signal to detect the position is negative in phase (second phase), the output level of the middle transmission coil 902 is larger than the output level of the outer transmission coil 901 and the inner transmission coil 903. In a fifth area 5, when the signal to detect the position is negative in phase, the output level of the outer transmission coil 901 is larger than the output level of the middle transmission coil 902 and the inner transmission coil 903.

In the all scan mode, scanning of sensor coils C1 to C18 in the X direction, scanning of sensor coils in the Y direction (not shown), selection of one of transmission coils 901 to 902, and driving the selected transmission coil in a positive or negative phase are performed in a similar manner to the first or second embodiment. That is, under control of a controller, a transmission coil selector selects one of transmission coils 901 to 903 disposed at particular locations relative to the locations of sensor coils in the X direction and sensor coils in the Y direction to be selected by a reception sensor coil selector, and the transmission coil selector drives the selected transmission coil in a positive or negative phase such that a signal to detect the position is supplied in the form of an alternating magnetic field to the position pointer thereby exciting the position pointer into the same direction. In synchronization with the selecting and driving of one of the transmission coil, the reception sensor coil selector scans all sensor coils in the X direction, and, after completion of scanning in the X direction, the reception sensor coil selector scans all sensor coils in the Y direction to detect the position of the position pointer.

In a sector scan mode, of the plurality of transmission coils 901 to 903, a transmission coil capable of providing a strongest signal to the position pointer located in a particular area is selected by the transmission coil selector under the control of the controller, depending on the relative spatial relationship between the position pointer and the transmission coils 901 to 903. The controller then controls the transmission signal generator to drive the selected transmission coil in a positive or negative direction such that the position pointer is excited in the same direction.

The phase of the signal by which to drive the selected transmission coil is inverted depending on whether the position pointer is located in the inside or the outside of the selected transmission coil, such that the signal to detect the position supplied in the form of an alternating magnetic field excites the position pointer in the same direction regardless of the location of the position pointer.

For example, when the position pointer is located in the area 5, the signal to detect the position is transmitted from the outer transmission coil 901 to detect the position of the position pointer 120. In this case, since the position pointer 120 is located inside the selected transmission coil 901, the transmission signal generator supplies the signal to detect the position with the negative phase to the transmission coil 901.

Simultaneously, the controller scans (sector-scans) sensor coils located in the area where the position pointer is located and also scans a predetermined number of sensor coils in areas close to the area in which the position pointer is located (for example, sensor coils C1 and C2 located in the left-hand area 5 in which the position pointer is located and sensor coils C3 and C4 located in the area 4 directly adjacent to the area 5 in which the position pointer is located are scanned) so as to select the sensor coils in those areas one by one thereby detecting the position of the position pointer.

When the position pointer is located in the area 4 on the left-hand side, the signal to detect the position is transmitted from the middle transmission coil 902 to detect the position of the position pointer. Also in this case, since the position pointer is located inside the transmission coil 902, the transmission signal generator supplies the signal to detect the position with the negative phase to the transmission coil 902. The signal from the position pointer is received by the sensor coils C3 and C4 located in the area 4 on the left-hand side and the sensor coils C2 and C5 located in areas adjacent to the area 4 on the left-hand side.

When the position pointer is located in the area 3 on the left-hand side, the signal to detect the position is transmitted from the outer transmission coil 901 to detect the position of the position pointer. In this case, since the position pointer is located inside the transmission coil 901, the transmission signal generator supplies the signal to detect the position with the positive phase to the transmission coil 901. The signal from the position pointer is received by the sensor coils C5 and C6 located in the area 3 on the left-hand side and the sensor coils C4 and C7 located in areas adjacent to the area 3 on the left-hand side.

When the position pointer is located in the area 2 on the left-hand side, the signal to detect the position is transmitted from the middle transmission coil 902 to detect the position of the position pointer. Also in this case, since the position pointer is located inside the selected transmission coil 902, the transmission signal generator supplies the signal to detect the position with the negative phase to the transmission coil 902. The signal from the position pointer is received by the sensor coils C7 and C8 located in the area 2 on the left-hand side and the sensor coils C6 and C9 located in areas adjacent to the area 2 on the left-hand side.

When the position pointer is located in the area 1, the signal to detect the position is transmitted from the inner transmission coil 903 to detect the position of the position pointer. Also in this case, since the position pointer is located inside the selected transmission coil 903, the transmission signal generator supplies the signal to detect the position with the positive phase to the transmission coil 902. The signal from the position pointer is received by the sensor coils C9, ..., and C10 located in the area 1 and the sensor coils C8 and C11 located in areas adjacent to the area 1.

This makes it possible to minimize an area in which the position of the position pointer cannot be detected. Because the phase of the signal supplied to the position pointer is controlled such that the position pointer is excited in the same direction, the error in the detected position caused by the residual induced voltage is minimized.

As described above, the present invention provides the position detection system comprising the position pointer including at least one coil, for pointing to a position, and the position detector for detecting the position pointed to by the position pointer by transmitting and receiving a signal to and from the position pointer by means of electromagnetic coupling. The position detector 100 or 700 includes the plurality of transmission coils 111 and 112 or 901 to 903 for transmitting a signal to detect the position to the position pointer 120, the plurality of sensor coils K1 to K10, L1 to L10, and C1 to C18 for receiving the signal transmitted from the position pointer 120, the signal transmission means (the controller 101, the transmission signal generator 102, the driver 103, and the transmission coil selector 104) for selecting one of the plurality of transmission coils 111 and 112 or 901 to 903 in accordance with the position of the position pointer 120 and driving the selected transmission coil so as to transmit the signal to detect the position, the reception means (the controller 101, the reception sensor coil selector 108, and the reception amplifiers 109, 701, or 703) for sequentially selecting the plurality of sensor coils K1 to K10, L1 to L10, and C1 to C18 and receiving the signal transmitted from the position pointer, and the position detection means (the controller 101 and the position coordinate calculators 110, or 702, and 704) for detecting the position pointed to by the position pointer in accordance with the signal received by the reception means. In this position detection system of the electromagnetic coupling type according to the present invention, the area in which the position of the position pointer is undetectable is minimized.

The signal transmission means selects a transmission coil capable of supplying a strongest signal to detect the position to the position pointer 120 depending on which area the position pointer 120 is located in, and drives the selected transmission coil thereby supplying the signal to detect the position in the form of an alternating magnetic field to the position pointer. The capability of supplying the strongest signal to detect the position makes it possible to minimize the influence of noise on the detection of the position, and thus a high-reliability position detection system can be achieved.

Depending on the relative spatial relationship between the selected transmission coil and the position of the position pointer detected by the position detection means, the signal transmission means drives the selected transmission coil such that the signal to detect the position excites the position pointer in the same direction regardless of the location of the position pointer. More specifically, for example, depending on whether the position pointer is located in the inside or the outside of the selected transmission coil (that is, depending on whether the position pointer is located in a central part or a peripheral part of the sensor area), the signal transmission means inverts the phase of the signal by which to drive the transmission coil such that the signal to detect the position excites the position pointer in the same direction regardless of the location of the position pointer. This minimizes the detection error of the position pointed to by the position pointer 120 caused by the residual induced voltage remaining in the position pointer 120.

The present invention also provides the position detectors 100 and 700 each comprising the plurality of transmission coils 111 and 112 or 901 to 903 for transmitting a signal to detect the position to the position pointer 120, the plurality of sensor coils K1 to K10, L1 to L10, and C1 to C18 for receiving the signal transmitted from the position pointer 120, the signal transmission means for selecting one of the plurality of transmission coils K1 to K10, L1 to L10, and C1 to C18 in accordance with the position of the position pointer 120 and driving the selected transmission coil so as to transmit the signal to detect the position, the reception means for selecting the plurality of sensor coils one by one and receiving the signal transmitted from the position pointer 120, and the position detection means for detecting the position pointed to by the position pointer 120 in accordance with the signal received by the reception means. By forming the position detector in the manner described above, the area in which the position of the position pointer is undetectable is minimized.

Furthermore, a plurality of sub areas are defined in the sensor area in which the plurality of transmission coils are disposed, and the signal transmission means selects a transmission coil capable of supplying a strongest signal to detect the position to the position pointer 120 depending on a particular sub area in which the position pointer is located, and drives the selected transmission coil thereby supplying the signal to detect the position to the position pointer 120 by means of electromagnetic coupling. The capability of supplying the strongest signal to detect the position makes it possible to minimize the influence of noise on the detection of the position, and thus a high-reliability position detection system can be achieved.

The plurality of transmission coils 111 and 112 are dedicated to transmitting the signal to detect the position, and the sensor coils 114 and 115 are dedicated to receiving the position-indicating signal, and thus a smaller number of transmission coils are needed than needed in an apparatus in which sensor coils are also used as transmission coils. This makes it possible to realize the transmission coil selector circuit in a small and simple form.

Although in the embodiments described above, the plurality of transmission coils are disposed so as to be coaxial with each other so that the position of the position pointer can be easily calculated, it is not necessarily needed to dispose the transmission coils in the coaxial form, and the plurality of transmission coils may be disposed in various manners. For example, the plurality of transmission coils may be disposed such that they overlap each other.

Although in the specific embodiments described above, two or three transmission coils are used, there is no particular restriction on the number of transmission coils as long as there are two or more transmission coils.

Furthermore, the transmission coils 111, 112, 901 to 903 do not necessarily need to be disposed outside the sensor coils 114 and 115.

Furthermore, although in the embodiments described above, the phase of the signal to detect the position is controlled such that the position pointer 120 is magnetically excited by the signal to detect the position in the same direction, it is not necessarily needed to control the phase of the signal to detect the position when it is not necessary to excite the position pointer in the same direction.

As described above, the position detection system of the electromagnetic coupling type according to the present invention has great advantages that the area in which the position of the position pointer is undetectable is minimized, and the detection error is also minimized.

The position detector of the electromagnetic coupling type according to the present invention has great advantages that the area in which the position of the position pointer is undetectable is minimized, and the detection error is also minimized.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A position detection system comprising a position pointer including at least one coil, for pointing to a position, and a position detector for detecting the position pointed to by the position pointer by transmitting and receiving a signal to and from the position pointer by means of electromagnetic coupling, the position detector comprising:

a plurality of transmission coils for transmitting a position pointer exciting signal to the position pointer;

a plurality of sensor coils for receiving a position indicating signal transmitted from the position pointer in response to the position pointer exciting signal;

signal transmission means for selecting one of the plurality of transmission coils in accordance with the position of the position pointer indicated by the position indicating signal and for driving the selected transmission coil so as to transmit the position pointer exciting signal to the position pointer;

reception means for selecting the plurality of sensor coils one by one and receiving the position indicating signal transmitted from the position pointer; and position detection means for detecting the position pointed to by the position pointer in accordance with the position indicating signal received by the reception means, wherein, depending on a relative spatial relationship between the selected transmission coil and the position of the position pointer detected by the position detection means, the signal transmission means drives the selected transmission coil such that the phase of the position pointer exciting signal supplied to the position pointer is maintained without being inverted.

2. A position detection system according to claim 1, wherein the plurality of transmission coils are disposed so as to be coaxial with each other.

3. A position detection system according to claim 1, wherein the signal transmission means defines a plurality of sub areas in a sensor area in which the plurality of transmission coils are disposed, selects a transmission coil capable of supplying a strongest position pointer exciting signal to the position pointer depending on a particular sub area in which the position pointer is located, and drives the selected transmission coil thereby supplying the position pointer exciting signal to the position pointer.

4. A position detection system according to claim 1, wherein, depending on whether the position pointer is located in the inside or the outside of the selected transmission coil, the signal transmission means inverts the phase of the position pointer exciting signal by which to drive the transmission coil such that the position pointer exciting signal supplied to the position pointer is maintained unchanged in terms of its phase.

5. A position detection system according to claim 1, wherein the plurality of transmission coils include a first transmission coil and a second transmission coil disposed outside the first transmission coil, the first and second transmission coils being coaxial with each other.

6. A position detection system according to claim 5, wherein three sub areas are defined in a sensor area in which the position of the position pointer is detectable, the three sub areas including a first area in which when the signal to detect the position is transmitted in a first phase, the first transmission coil is capable of transmitting the position pointer exciting signal with a greater signal level than the second transmission coil, a second area in which when the position pointer exciting signal is transmitted in the first phase, the second transmission coil is capable of transmitting the position pointer exciting signal with a greater signal level than the first transmission coil, and a third area in which when the position pointer exciting signal is transmitted in a second phase opposite to the first phase, the first transmission coil is capable of transmitting the position pointer exciting signal with a greater signal level than the second transmission coil, and wherein the signal transmission means transmits the position pointer exciting signal in the first phase from the first transmission coil when the position pointer is located in the first area, the signal transmission means transmits the position pointer exciting signal in the first phase from the second transmission coil when the position pointer is located in the second area, and the signal transmission means transmits the position pointer exciting signal in the second phase from the first transmission coil when the position pointer is located in the third area.

7. A position detection system according to claim 6, wherein the reception means sequentially selects a predetermined number of sensor coils located in the first area and an area adjacent to the first area and receives the position indicating signal transmitted from the position pointer when the position pointer is located in the first area, the reception means sequentially selects a predetermined number of sensor coils located in the second area and an area adjacent to the second area and receives the position indicating signal transmitted from the position pointer when the position pointer is located in the second area, and the reception means sequentially selects a predetermined number of sensor coils located in the third area and an area adjacent to the third area and receives the position indicating signal transmitted from the position pointer when the position pointer is located in the third area.

8. A position detector that transmits and receives a signal to and from a position pointer including at least one coil for pointing to a position thereby detecting the position pointed to by the position pointer, the position detector comprising:

a plurality of transmission coils for transmitting a position pointer exciting signal to the position pointer;

a plurality of sensor coils for receiving a position indicating signal transmitted from the position pointer;

signal transmission means for selecting one of the plurality of transmission coils in accordance with the position of the position pointer indicated by the position indicating signal and for driving the selected transmission coil so as to transmit the position pointer exciting signal to the position pointer;

reception means for selecting the plurality of sensor coils one by one and receiving the position indicating signal transmitted from the position pointer; and position detection means for detecting the position pointed to by the position pointer in accordance with the position indicating signal received by the reception means.

9. A position detector according to claim 8, wherein the plurality of transmission coils are disposed so as to be coaxial with each other.

10. A position detector according to claim 8, wherein the signal transmission means defines a plurality of sub areas in a sensor area in which the plurality of transmission coils are disposed, selects a transmission coil capable of supplying a strongest position pointer exciting signal to the position pointer depending on a particular sub area in which the position pointer is located, and drives the selected transmission coil thereby supplying the position pointer exciting signal to the position pointer.

11. A position detector according to claim 8, wherein depending on a relative spatial relationship between the selected transmission coil and the position of the position pointer detected by the position detection means, the signal transmission means drives the selected transmission coil such that the phase of the position pointer exciting signal supplied to the position pointer is maintained without being inverted.

12. A position detector according to claim 11, wherein depending on whether the position pointer is located in the inside or the outside of the selected transmission coil, the signal transmission means inverts the phase of the position pointer exciting signal by which to drive the transmission coil such that the position pointer exciting signal supplied to the position pointer is maintained unchanged in terms of its phase.

13. A position detector according to claim 8, wherein the plurality of transmission coils include a first transmission coil and a second transmission coil disposed outside the first transmission coil, the first and second transmission coils being coaxial with each other.

14. A position detector according to claim 13, wherein three sub areas are defined in a sensor area in which the position of the position pointer is detectable, the three sub areas including a first area in which when the position pointer exciting signal is transmitted in a first phase, the first transmission coil is capable of transmitting the position pointer exciting signal with a greater signal level than the second transmission coil, a second area in which when the position pointer exciting signal is transmitted in the first phase, the second transmission coil is capable of transmitting the position pointer exciting signal with a greater signal level than the first transmission coil, and a third area in which when the position pointer exciting signal is transmitted in a second phase opposite to the first phase, the first transmission coil is capable of transmitting the position pointer exciting signal with a greater signal level than the second transmission coil, and wherein the signal transmission means transmits the position pointer exciting signal in the first phase from the first transmission coil when the position pointer is located in the first area, the signal transmission means transmits the position pointer exciting signal in the first phase from the second transmission coil when the position pointer is located in the second area, and the signal transmission means transmits the position pointer exciting signal in the second phase from the first transmission coil when the position pointer is located in the third area.

15. A position detector according to claim 14, wherein the reception means sequentially selects a predetermined number of sensor coils located in the first area and an area adjacent to the first area and receives the position indicating signal transmitted from the position pointer when the position pointer is located in the first area, the reception means sequentially selects a predetermined number of sensor coils located in the second area and an area adjacent to the second area and receives the position indicating signal transmitted from the position pointer when the position pointer is located in the second area, and the reception means sequentially selects a predetermined number of sensor coils located in the third area and an area adjacent to the third area and receives the position indicating signal transmitted from the position pointer when the position pointer is located in the third area.

16. A power conserving position detector that transmits and receives a signal to and from a position pointer including at least one coil for pointing to a position thereby detecting the position pointed to by the position pointer, the position detector comprising:

a plurality of transmission coils for transmitting a position pointer exciting signal to the position pointer, each of said plurality of transmission coils comprising a resonant circuit tuned to resonate at a selected resonant frequency;

a plurality of sensor coils for receiving a position indicating signal transmitted from the position pointer in response to the position pointer exciting signal;

signal transmission means for selecting one of the plurality of transmission coil in accordance with the position of the position pointer indicated by the position indicating signal and driving the selected transmission coil with a pulsed carrier signal at said selected resonant frequency so as to transmit the position pointer exciting signal to the position pointer for detecting the position of the position pointer;

reception means for selecting the plurality of sensor coils one by one and receiving the position indicating signal transmitted from the position pointer; and position detection means for detecting the position pointed to by the position pointer in accordance with the position indicating signal received by the reception means.

17. The power conserving position detector according to claim 16, wherein the plurality of resonant transmission coils are disposed so as to be coaxial with each other.

18. The power conserving position detector according to claim 16, wherein the signal transmission means defines a plurality of sub areas in a sensor area in which the plurality of transmission coils are disposed, selects a transmission coil capable of supplying a strongest position pointer exciting signal to the position pointer depending on a particular sub area in which the position pointer is located, and drives the selected transmission coil with said pulsed carrier signal thereby supplying the position pointer exciting signal to the position pointer.

19. The power conserving position detector according to claim 16, wherein depending on a relative spatial relationship between the selected transmission coil and the position of the position pointer detected by the position detection means, the signal transmission means drives the selected transmission coil such that the phase of the pulsed carrier position pointer exciting signal supplied to the position pointer is maintained without being inverted.

20. The power conserving position detector according to claim 16, wherein said position detection means is configured to provide user input data to a portable data processing device.

21. The power conserving position detector according to claim 16, wherein said position detection means is configured to provide user input data to a personal digital assistant.

22. The power conserving position detector according to claim 16, wherein said position detection means is configured to provide user input data to a mobile telephone.

23. The power conserving position detector according to claim 16, wherein said position detection means is configured to provide user input data to a personal computer.

24. A method for transmitting an electromagnetic wave from a position detector to a position pointer carrying a resonant circuit, comprising:
  (a) providing, in the position detector, a plurality of sensor coils defining a sensor area and at least one transmission coil for transmitting a signal to detect the position of the position pointer, the transmission coil being arranged in the sensor area in an overlapping manner with the sensor coils, the transmission coil comprising a resonant circuit tuned to resonate at a selected resonant frequency;
  (b) energizing the transmission coil with a pulsed carrier signal at the selected transmission coil resonant frequency for inducing current in the transmission coil in a first direction when the position pointer is detected in a first region of the sensor area and inducing current in the transmission coil in a second direction when the position pointer is detected in a second region of the sensor area; and
  (c) receiving the pulsed carrier signal in the position pointer resonant circuit and, in response, radiating a pulsed position pointer signal.

25. The method of claim 24, further comprising:
  (d) receiving the pulsed position pointer signal in the position detector sensor coils.

26. The method of claim 24, wherein the step of providing the at least one transmission coil comprising a resonant circuit comprises providing an inductive transmission coil connected in series with a capacitor.

27. The method of claim 24, wherein the step of providing the at least one transmission coil comprises providing first and second transmission coils, the first transmission coil being wound proximate to the periphery of the position detector sensor coils along a first path; and
  wherein the second transmission coil is wound proximate to the periphery of the position detector sensor coils along a second path not coextensive with said first path.

28. The method of claim 27, further comprising:
  (d) energizing solely the first transmission coil with the pulsed carrier signal at the selected resonant frequency; and
  (e) energizing solely the second transmission coil with the pulsed carrier signal at the selected resonant frequency.

29. A position detector for detecting a position of a position pointer, the detector comprising:
  a sensor area defined by a plurality of sensor coils for sensing a position indicating signal transmitted from the position pointer;
  a reception unit for determining a position of the position pointer based on the sensed position indicating signal,
  a plurality of transmission coils for transmitting a pointer exciting signal to the position pointer, said transmission coils disposed to, at least partially, overlap with said sensor coils in said sensor area, said transmission coils and said sensor coils being different coils; and
  a transmission coil selector for selectively driving current in said transmission coils so that the pointer exciting signal transmitted to the position pointer maintains the same polarity regardless of the position of the position pointer with respect to the sensor area.

* * * * *